United States Patent [19]

Izumisawa

[11] Patent Number: 5,918,686
[45] Date of Patent: Jul. 6, 1999

[54] PNEUMATIC ROTARY TOOL

[75] Inventor: Osamu Izumisawa, Tokyo, Japan

[73] Assignee: S.P. Air Kabusiki Kaisha, Tokyo, Japan

[21] Appl. No.: 08/881,424

[22] Filed: Jun. 24, 1997

[51] Int. Cl.$^6$ .............................. B23B 45/04; B23B 21/00
[52] U.S. Cl. .............................. 173/20; 173/47; 173/169; 173/221
[58] Field of Search ........................ 173/20, 47, 168–170, 173/218, 221

[56] References Cited

U.S. PATENT DOCUMENTS

| 2,947,283 | 8/1960 | Roggenburk | 173/169 |
|---|---|---|---|
| 3,093,360 | 6/1963 | Krouse | 173/169 |
| 3,833,068 | 9/1974 | Hall | 173/169 |
| 3,989,113 | 11/1976 | Spring, Sr. et al. | 173/169 |
| 4,379,492 | 4/1983 | Hiroaka . | |
| 5,199,505 | 4/1993 | Izumisawa . | |
| 5,377,769 | 1/1995 | Hasuo et al. . | |
| 5,535,867 | 7/1996 | Coccaro et al. . | |

*Primary Examiner*—Stephen F. Gerrity
*Attorney, Agent, or Firm*—Senniger, Powers, Leavitt & Roedel

[57] ABSTRACT

A pneumatic rotary tool capable of operating in forward and reverse directions includes a housing and an output shaft projecting from the housing for transmitting torque to an object. An air motor drives rotation of the output shaft in the forward and reverse directions. Air passages extend from an air inlet to the motor for delivering pressurized air to the motor. One passage delivers air to the motor to power the motor to drive the output shaft in the forward direction and the other passage delivers air to the motor to power the motor to drive the output shaft in the reverse direction. A selector valve is disposed between the air inlet and the air passages such that fluid communication between the air inlet and the air passages is blocked except through the selector valve. The selector valve is movable with respect to the housing between a position in which the air inlet is in fluid communication with one passage and fluid communication with the other passage is blocked by the valve for operating the tool in the forward direction, and a position in which the air inlet is in fluid communication with the other passage and fluid communication with the one passage is blocked by the valve for operating the tool in the reverse direction. The selector valve is also constructed for selective adjustment of the selector valve to change the torque output of the motor.

3 Claims, 4 Drawing Sheets

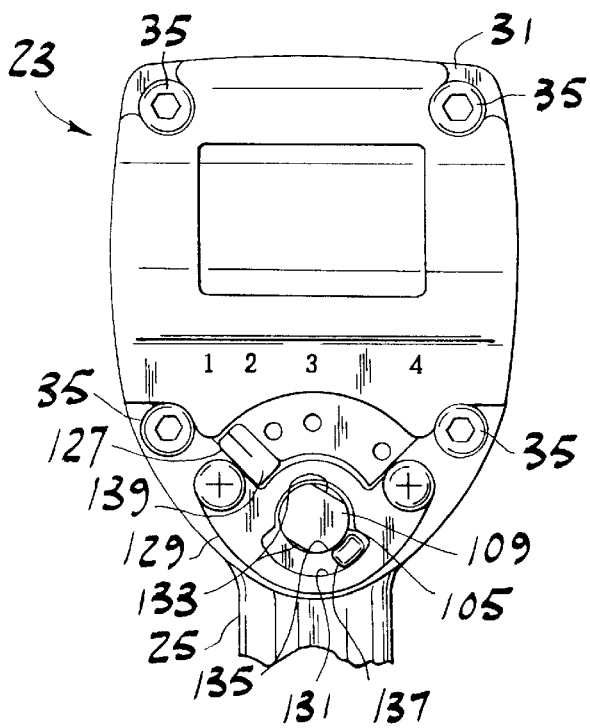
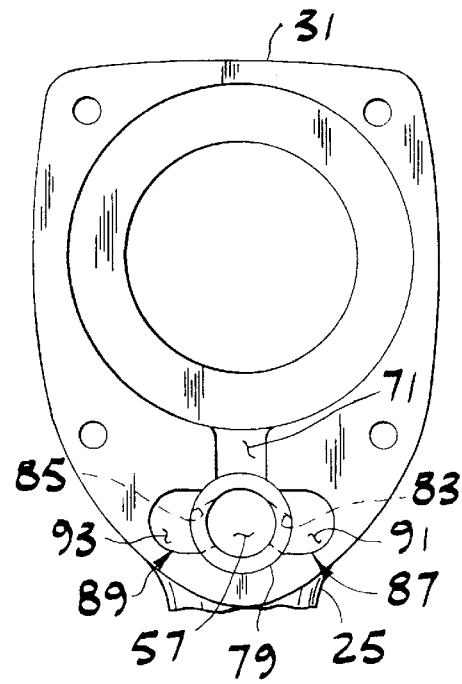
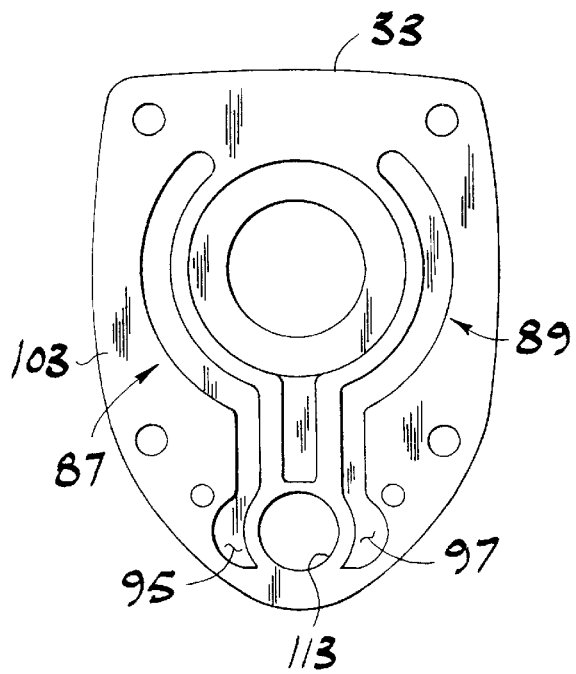
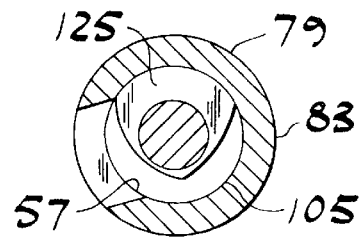
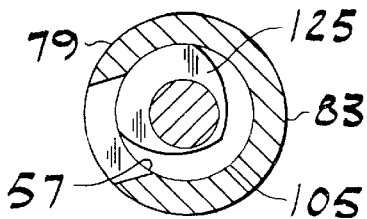

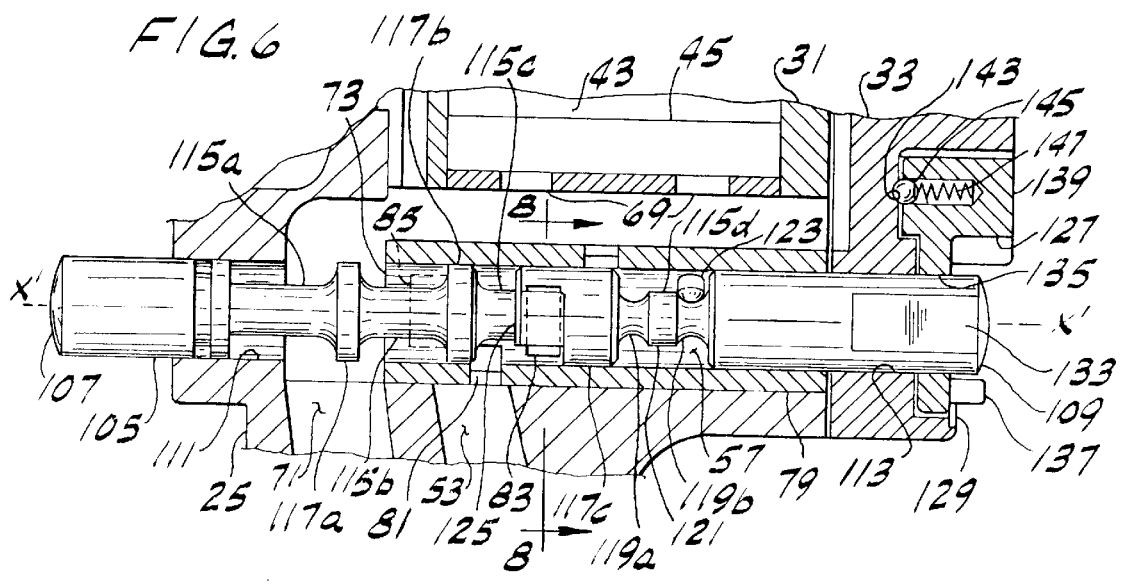
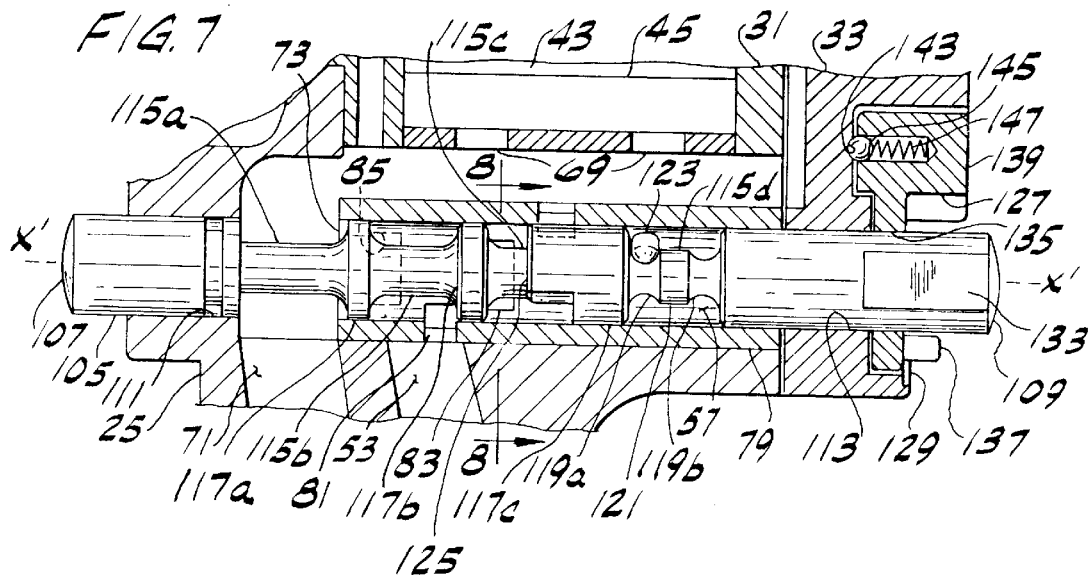

PNEUMATIC ROTARY TOOL

BACKGROUND OF THE INVENTION

This invention relates generally to a pneumatic rotary tool, and more particularly to a pneumatic rotary tool capable of operating in forward and reverse directions.

Conventional pneumatic rotary tools, such as impact wrenches, comprise a housing and an air motor disposed in the housing. The air motor is powered by pressurized air received in the housing and drives rotation of a shaft supported by the housing. The shaft projects outward from the housing for engaging a fastener element, such as a nut or a bolt. The tools are typically provided with a control system for switching the mode of operation of the tool between a forward operating mode in which the fastener element is tightened and a reverse operating mode in which the fastener element is loosened. It is also common for the tool to include a regulating system for regulating the torque generated by the air motor and transmitted to the fastener element. For example, the impact wrench disclosed in U.S. Pat. No. 5,377,769 (Hasuo et al.) includes both an air supply valve having air supply regulating slots for regulating the flow of air to the motor and a changeover valve for controlling the forward and reverse operating modes of the wrench. Thus, there are two separate valves to control the direction of rotation and the torque.

The conventional pneumatic rotary tools described above are not as efficient as desired because the forward/reverse selector and the torque regulator function separately, requiring two distinct sets of valves and selectors. This results in increased manufacturing and operating costs and an increased risk of mechanical failure. Moreover, because two separate valves are used, the tool operator must typically release the grip of the tool to move the valves, or must use a second hand to move the valves, resulting in time consuming, inefficient operation.

SUMMARY OF THE INVENTION

Among the several objects of this invention may be noted the provision of a pneumatic rotary tool which is more efficient to operate; the provision of such a tool which has fewer parts; the provision of such a tool which reduces the risk of mechanical failure; the provision of such a tool which is constructed for switching between the forward and reverse directions and for regulating the torque output of the motor without releasing the tool; the provision of such a tool which can be fully operated and controlled by a single hand of the operator; and the provision of such a tool which is easier and less expensive to manufacture.

A pneumatic rotary tool of this invention capable of operating in forward and reverse directions generally comprises a housing and an output shaft supported by the housing for rotation about its longitudinal axis. The output shaft projects from the housing for transmitting torque to an object. An air motor disposed in the housing is connected to the output shaft for driving rotation of the output shaft in the forward and rearward directions. An air inlet is constructed for connection to a source of pressurized air, and air passaging means extends from the air inlet to the motor for delivering pressurized air to the motor to power the motor. The passaging means includes a first passage for delivering air to the motor to power the motor to drive the output shaft in the forward direction and a second passage for delivering air to the motor to power the motor to drive the output shaft in the reverse direction. Air is exhausted from the housing through an air exhaust. A selector valve supported by the housing is disposed between the air inlet and the first and second passages such that fluid communication between the air inlet and the first and second passages is blocked except through the selector valve. The selector valve is movable with respect to the housing between a first position in which the air inlet is in fluid communication with the first passage and fluid communication with the second passage is blocked by the valve for operating the tool in the forward direction, and a second position in which the air inlet is in fluid communication with the second passage and fluid communication with the first passage is blocked by the valve for operating the tool in the reverse direction. The selector valve is also constructed for selective adjustment of the selector valve to change the torque output of the motor.

Other objects and features will become in part apparent and in part pointed out hereinafter.

BRIEF DESCRIPTION OF THE DRAWINGS

FIG. 3 is a fragmentary rear elevation of the rotary tool;

FIG. 4 is the fragmentary rear elevation of FIG. 3 with a back plate removed to show internal construction of the tool;

FIG. 5 is a front elevation of the back plate;

FIG. 6 is an enlarged fragment of the section of FIG. 2 showing a selector valve in a forward position within the housing;

FIG. 7 is similar to FIG. 6 but showing the selector valve in a rearward position within the housing;

FIG. 8 is a schematic section taken in the plane of line 8—8 of FIG. 6 with the selector valve in a first rotational position within the housing; and FIG. 9 is similar to FIG. 8 but showing the selector valve in a second rotational position within the housing.

Corresponding parts are designated by corresponding reference characters and numerals throughout the several views of the drawings.

DESCRIPTION OF THE PREFERRED EMOLUMENT

Figure 1:
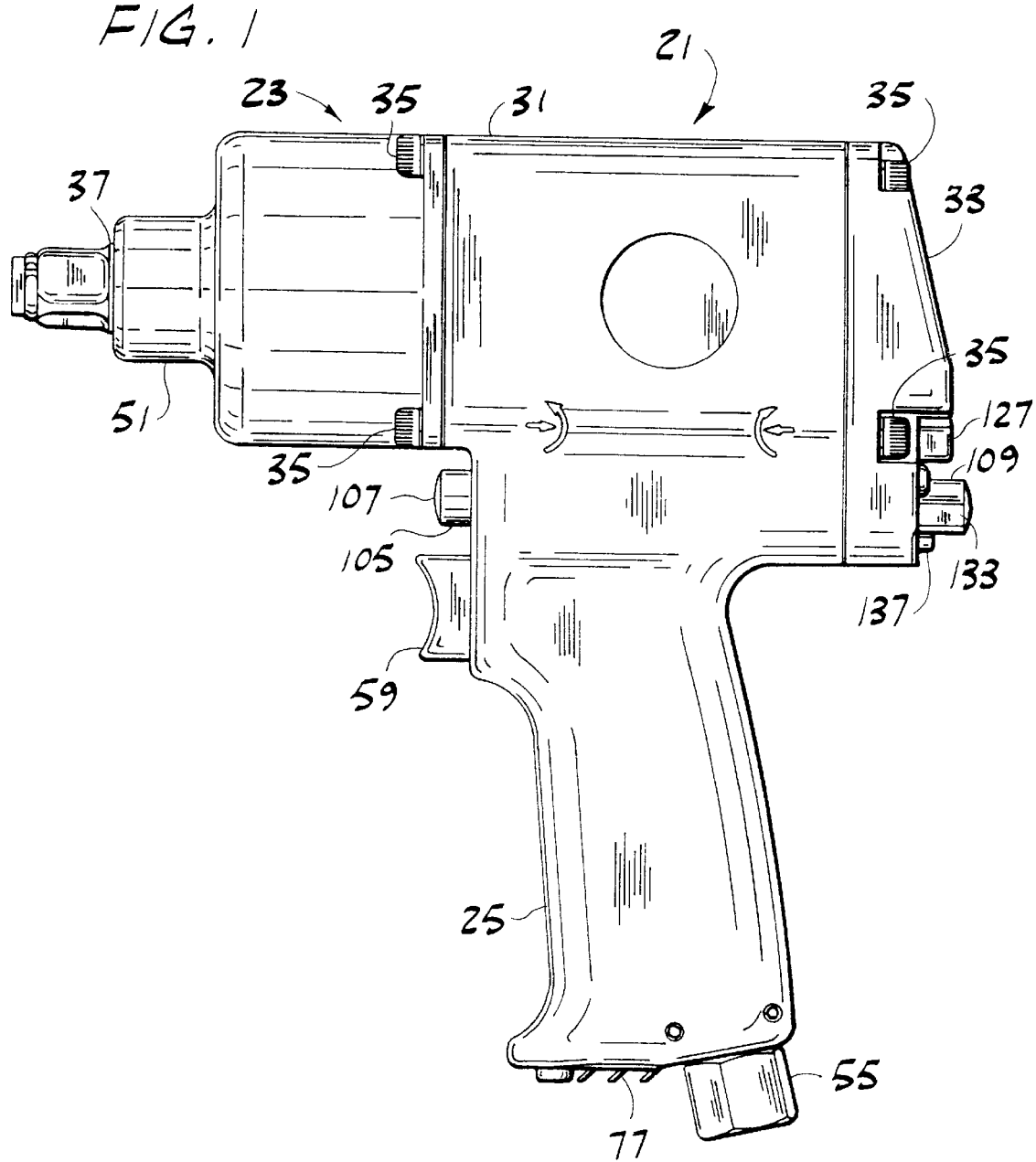
FIG. 1 is a right side elevation of a pneumatic rotary tool of the present invention.

Referring now to FIG. 1, a pneumatic rotary tool of the present invention is indicated generally by the reference numeral 21. The tool comprises a housing, indicated generally at 23, having a generally vertically oriented grip 25 for grasping by the tool operator and a body 27 on top of the grip. The body 27 of the housing 23 includes a hammer case 29 defining a front end of the tool 21, an air motor case 31 adjacent the hammer case, and a backing plate 33 defining a rear end of the tool. In the illustrated embodiment, the housing 23 is of three piece construction, with the grip 25 and air motor case 31 being integrally formed as one piece, and the backing plate 33 and hammer case 29 being secured to the air motor case in a suitable manner (e.g., as by fasteners 35, shown in FIG. 3). The backing plate 33, air motor case 31 and grip 25 are constructed of steel, and the hammer case 29 is constructed of hardened steel. It is understood, however, that the tool housing 23 may be constructed of other materials and may comprise any number of pieces, including one integrally formed piece, without departing from the scope of this invention.

Figure 2:
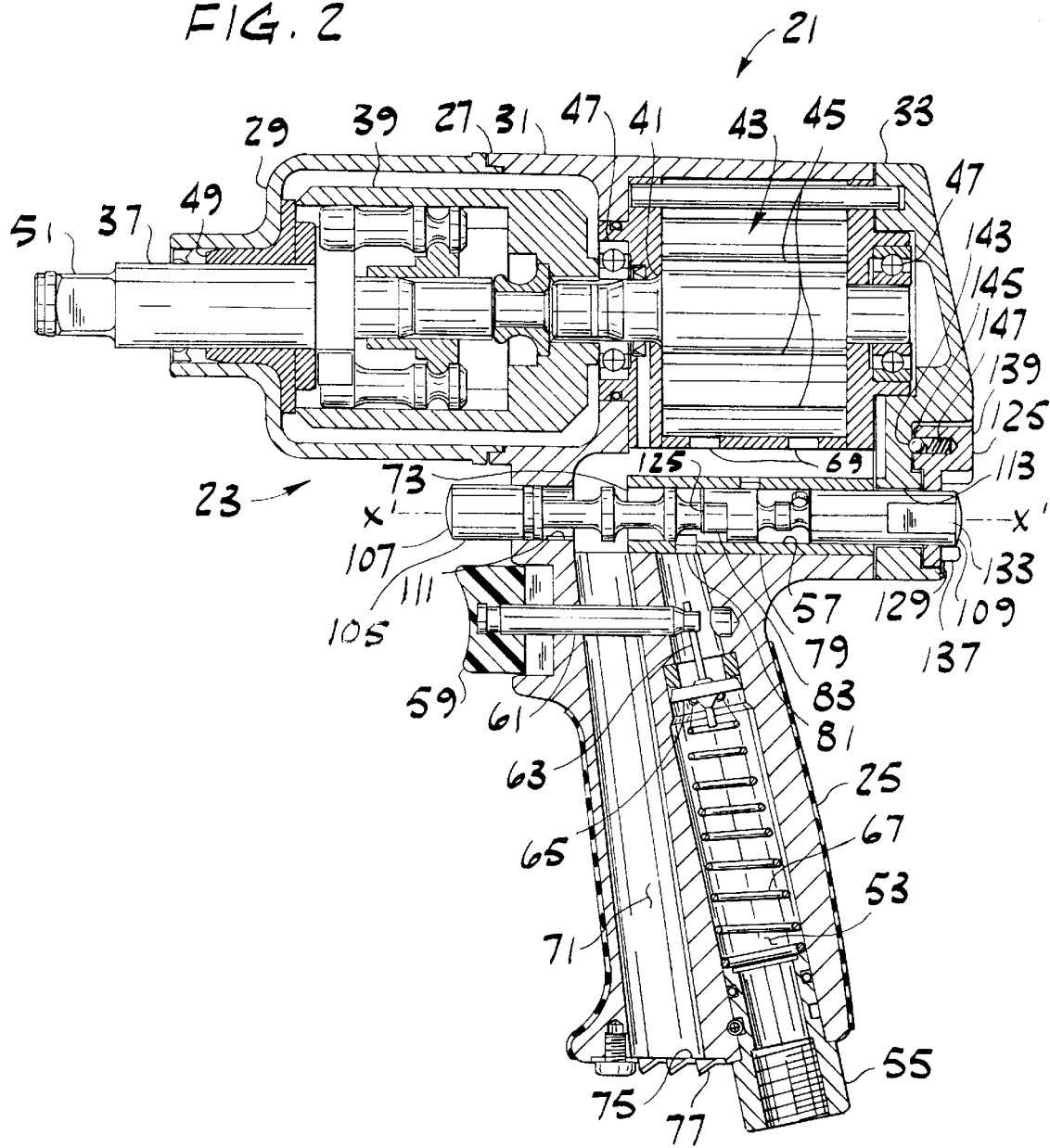
FIG. 2 is a schematic vertical section of the rotary tool of FIG. 1.

With reference to FIG. 2, the tool 21 further comprises various operating components within the housing 23. An output shaft 37 projects outward from the front end of the housing for transmitting torque to an object (not shown), such as a nut or a bolt. A hammer mechanism 39 is disposed in the hammer case 29 and is connected to the output shaft for conjoint rotation. An air motor (generally indicated at 43) has a drive shaft connected to the hammer mechanism for driving rotation of the output shaft. The air motor 43 is a conventional air motor known to those skilled in the art as being capable of rotation about its rotational axis in a forward (clockwise) direction and a reverse (counter-clockwise) direction in response to the pressurized air flowing across vanes 45 projecting radially outward from the motor. The drive shaft 41 extends outward from opposing ends of the motor 43 and defines the rotation axis of the motor. The drive shaft 41 is rotatably mounted in the housing 23 by suitable bearings 47 disposed in the housing on opposite ends of the air motor 43 so that the air motor is supported in the motor case by the drive shaft and bearings.

The output shaft 37 is generally cylindrical and is supported for rotation about its longitudinal axis by a bushing 49 disposed in the hammer case 29. An outer end 51 of the output shaft 37 projects outward from the front end of the housing 23 and is configured for receiving a wrench socket (not shown) or other suitable fitting (not shown) adapted for engaging the object to be tightened or loosened. The hammer mechanism 39 disposed in the hammer case 29 of the housing 23 is connected at its front end to the output shaft 37 and at its rear end to the drive shaft 41 so that the air motor 43 is operatively connected to the output shaft via the drive shaft and hammer mechanism for driving rotation of the output shaft. The hammer mechanism 39 is preferably a conventional impact clutch type mechanism, such as that disclosed in U.S. Pat. No. 5,199,505, which is incorporated herein by reference, and will not be further described herein.

Still referring to FIG. 2, an air inlet 53 extends within the grip 25 of the housing 23 for receiving pressurized air into the housing. A fitting 55 is secured to the bottom of the grip 25 and is adapted for connection, such as by a hose (not shown), to a source of pressurized air (not shown). The fitting 55 is capable of turning within the grip 25 to inhibit twisting of the hose as the operator moves around with the tool 21. The air inlet 53 extends upward from the bottom of the grip 25 to a valve chamber 57 defined by a generally cylindrical valve chamber wall 79 within the housing 23. A trigger 59 projects outward from the front of the grip 25 and is connected by suitable linkage, such as a trigger pin 61 and valve pin 63, to a primary air valve 65 disposed in the air inlet 53 upstream from the valve chamber 57.

The primary air valve 65 can be moved between an opened position (not shown) in which air is permitted to flow through the air inlet 53 to the valve chamber 57 and a closed position (FIG. 2) in which the valve blocks the flow of air to the valve chamber. A coil spring 67 in the air inlet 53 extends between the fitting 55 and the primary air valve 65 and, along with pressurized air in the air inlet, biases the valve toward its closed position. The trigger pin 61 and valve pin 63 are connected in a conventional manner whereby inward movement of the trigger pin caused by squeezing the trigger 59 effects a downward movement of the valve pin against the bias of the spring 67 and pressurized air to move the valve to its opened position.

As will be described later in further detail, air entering the valve chamber 57 is directed to the air motor case 31 for powering the air motor 43 and is then exhausted from the air motor case through exhaust ports 69 located generally at the bottom of the motor case. An air exhaust 71 communicates with the exhaust ports 69 and extends within the grip 25 in generally parallel relationship with the air inlet 53 past a forward end 73 of the valve chamber 57 and down to the bottom of the grip. The air exhaust 71 is open to the external environment of the tool 21 for permitting the pressurized air to be exhausted externally of the housing 34 through the bottom of the grip 25. A conventional muffler 75 and angled cover 77 are secured to the bottom of the grip 25 so that the exhausted air passes through the muffler and angled cover to reduce noise and keep exhaust air away from the working area (e.g. the fastener element).

A tubular valve chamber wall 79 is disposed generally below the air motor case 31 and extends longitudinally within the housing 23 from adjacent the backing plate 33 to a position forward of the air inlet 53, terminating adjacent the air exhaust 71. The valve chamber wall 79 defines the valve chamber 57. As best seen in FIGS. 6 and 7, an inlet port is defined by a slot 81 in the valve chamber wall 79 and provides fluid communication between the air inlet 53 and the valve chamber 57 so that pressurized air is permitted to flow into the valve chamber when the primary air valve 65 is in its opened position. A pair of outlet ports in the valve chamber are defined by a first slot 83 (shown in FIGS. 6 and 7 as being on the far side of the valve chamber wall 79), corresponding to the forward operating mode and disposed rearward of the inlet port 81, and a second slot 85 (shown in phantom in FIGS. 6 and 7 because the slot is actually in the near side of the valve chamber wall 79) corresponding to the reverse operating mode and disposed forward of the inlet port. Passages, indicated generally as 87, 89, extend respectively from each of the outlet ports 83, 85 to the air motor case 31 to provide fluid communication between the valve chamber 57 and the motor case. Each of the passages 87, 89 comprises a respective air passage 91, 93 and air groove 95, 97. In the illustrated embodiment, the valve chamber 57 and the left and right passages 87, 89 broadly define air passaging means extending between the air inlet 53 and the air motor 43 for delivering pressurized air to the motor. It is understood, however, that the air passaging means may be configured other than described herein without departing from the scope of this invention. It is also understood that the input and output slots may be arranged other than as described with respect to each other without departing from the scope of this invention.

With reference to FIG. 4, the air passages 91, 93 are disposed on opposite sides of the valve chamber 57. These air passages 91, 93 extend longitudinally along substantially the entire length of the valve chamber wall 79 to the backing plate 33 of the housing 23. The air passages 91, 93 are each open to their respective outlet port 83, 85 in the valve chamber wall 79 to provide fluid communication between the valve chamber 57 and the air passages whereby air exiting the valve chamber through the outlet port 83 corresponding to the forward operating mode flows rearward through one air passage 91 and air exiting through the outlet port 85 corresponding to the reverse operating mode flows rearward through the opposing air passage 93. As shown in FIG. 5, the air grooves 95, 97 are formed within an interior surface 103 of the backing plate 33. Each groove 95, 97 is in fluid communication at its lower end with a respective air passage 91, 93 and extends generally upward along the backing plate 33 in communication with the interior of the air motor case 31 to direct pressurized air over the vanes 45 of the air motor 43 to power the motor in its conventional manner.

Again referring to FIG. 2, a selector valve 105 has a front end 107 and rear end 109, and is received in the valve chamber 57 so that the selector valve is disposed generally downstream of the primary air valve 65 and upstream of the air passages 91, 93. The selector valve 105 is preferably constructed from a cylindrical steel rod and is capable of sliding movement translationally along its longitudinal axis X' within the valve chamber 57 between a forward position (FIG. 6) corresponding to the forward operating mode of the tool 21 and a rearward position (FIG. 7) corresponding to the reverse operating mode of the tool. The front of the grip 25 has a bore 111 located slightly above the trigger 59 and aligned with the valve chamber 57 and longitudinal axis X' of the selector valve 105 for receiving the front end 107 of the selector valve. The backing plate 33 has a similar bore 113 for receiving the rear end 109 of the selector valve 105.

As shown in FIGS. 6 and 7, the selector valve 105 extends outward of the valve chamber 57, passing forward through the air exhaust 71, and is sufficiently long so that in its forward position, the front end 107 of the selector valve protrudes forward from the housing 23 to be accessible for pushing the valve toward its rearward position, and in the rearward position the rear end 109 of the selector valve protrudes rearward from the backing plate 33 of the housing to be accessible for pushing the valve toward its forward position. The front and rear ends 107, 109 of the selector valve 105 are sized for close-fitting contact with the housing 23 in the bores 111, 113 to prevent pressurized air from leaking out of the front and rear of the housing.

The selector valve has four annular grooves 115a–d intermediate the ends 107, 109 of the valve. The grooves 115a–d are spaced apart by annular lands 117a–c (respectively, a forward, an intermediate and a rear land) each sized for close-fitting contact with the valve chamber wall 79 to seal against pressurized air leaking within the valve chamber 57 between the grooves 115b and 115c. In the forward position of the valve 105, the groove 115c corresponding to the forward operating mode is aligned with the inlet port 81 and the outlet port 83 corresponding to the forward operating mode. The length of the groove 115c is such that the rear land 117c is slightly rearward of the outlet port 83 and the intermediate land 117b is slightly forward of the inlet port 81. In this position, pressurized air entering the valve chamber 57 from the air inlet 53 is directed to the air motor 43 via the outlet port 83 and its corresponding air passage 91 and air groove 95 for powering the motor in the forward operating mode of the tool 21. The front end 107 of the selector valve 105 is positioned on one side of the air exhaust 71, within the bore 111 in the front of the grip 25, to prevent pressurized air from leaking through the front of the housing 23 and the intermediate land 117c is slightly rearward of the outlet port 85 corresponding to the reverse operating mode (with the forward land 117a positioned in the air exhaust) to prevent pressurized air from leaking within the valve chamber 57.

In the rearward position (FIG. 7) of the selector valve 105, the groove 115b corresponding to the reverse operating mode of the tool 21 is aligned with the inlet port 81 and the outlet port 85 corresponding to the reverse operating mode. The length of the groove 115b is such that the intermediate land 117b is slightly rearward of the inlet port 81 and the forward land 117a is slightly forward of the outlet port 85. In this position, pressurized air entering the valve chamber 57 from the air inlet 53 is directed to the air motor 43 via the outlet port 85 and the corresponding air passage 93 and air groove 97 for powering the motor in the reverse operating mode of the tool 21. The front end 107 of the selector valve 105 is disposed within the bore 111 in the front of the grip 25 to prevent pressurized air from leaking through the front of the housing 23 and the forward land 117a is positioned slightly forward of the outlet port 85 to prevent pressurized air in the air exhaust 71 from leaking into the valve chamber 57.

The rear groove 115d of the selector valve 105 is used for locating and releasably securing the selector valve in its selected forward or rearward position to inhibit undesired switching between the forward and reverse operating modes of the tool 21. The groove 115d has a pair of annular seats 119a, 119b, corresponding respectively to the reverse and forward operating modes of the tool 21, and a transition portion 121 of constant diameter intermediate the seats. A locator pin 123 is disposed within the housing and extends into the valve chamber 57 adjacent the rear groove 115d. The pin 123 is biased toward the groove 115d by a spring (not shown) within the tool housing 23 to locate and retain the pin in the seat in the desired forward or rearward position of the selector valve 105. The locator pin 123 is movable against the bias of the spring upon pushing the selector valve 105 longitudinally within the valve chamber 57 between the forward and rearward positions of the valve. The front groove 115a is generally aligned, partially or wholly, with the air exhaust 71 in both the forward and rearward positions of the selector valve 105 to reduce the blockage of air flowing through the air exhaust.

To regulate the torque generated by the air motor 43, the rear land 117c is provided with a stopper surface (FIGS. 6–9) comprising an extension member 125 projecting forward from a portion of the land so that in the forward position of the selector valve 105 the extension member is generally at the same axial position as the outlet port 83 of the valve chamber wall 79 corresponding to the forward operating mode of the tool 21. In the illustrated embodiment, the extension member 125 is integrally formed with the rear land 117c, although the extension member may be constructed independently of the land and fastened to the land by suitable fastening methods without departing from the scope of this invention. As shown in FIGS. 8 and 9, the selector valve 105 is rotatable in the valve chamber 57 between a non-covering position in which the extension member 125 does not cover any portion of the outlet port 83 corresponding to the forward operating mode to permit maximum air flow to the air motor 43, and a covering position in which the extension member 125 covers a portion of the outlet port 83 to restrict the flow of pressurized air to the air motor 43, thereby decreasing the torque generated by the air motor during forward operation of the tool 21.

Referring to FIG. 3, a lever 127 is mounted on the rear end 109 of the selector valve 105 externally of the housing 23 and retained in close relationship with the backing plate 33 by a retaining plate 129 having an opening 131 to allow passage of the valve. The rear end 109 of the selector valve 105 has a pair of opposing flats 133 adapted for engagement by the lever 127. The lever 127 has a corresponding opening 135 conforming to the cross sectional shape of the rear end 109 of the selector valve 105, and engaging the flats 133 in the opening so that the lever and selector valve are connected for conjoint rotation about the longitudinal axis X' of the valve. This lever 127 is used to apply a torque to the selector valve 105 for rotating the valve between its covering and non-covering positions. However, the lever opening 135 is sized to allow sliding movement of the selector valve 105 through the lever 127 between the forward and reverse positions of the valve. A nub 137 formed integrally with the lever 127 projects outward from the lever generally below the selector valve 105 and through the opening 131 in the retaining member 129.

A tab 139 is also integrally formed with the lever 127 and extends outward from the lever generally above the selector valve 105. The tab 139 is located sufficiently close to the grip 25 for permitting the tool operator to use a finger, such as the thumb of the hand holding the grip, to move the tab to rotate the selector valve 105 between its covering and non-covering positions without releasing the grip. A series of torque setting indicia 141 are formed in the backing plate 33 whereby alignment of the tab 139 with the indicia indicates the level of torque output generated by the air motor 43 as the selector valve 105 is rotated by the lever 127 between its covering and non-covering positions. The backing plate 33 has four dimples 143 corresponding to four possible torque output settings. The dimples 143 are sized for receiving a ball 145 disposed in the tab 139 and biased inward of the dimples by a suitable spring 147 within the tab to locate and releasably secure the lever 127 in the position indicated by the torque setting indicia 141 (FIG. 3). The tab 139, the torque setting indicia 141, the dimples 143, the ball 145 and the spring 147 broadly define "indicator means" in the illustrated embodiment.

In operation, the fitting 55 at the bottom of the grip 25 is connected to the hose leading from the source of pressurized air to receive pressurized air into the air inlet 53 of the housing 23. The grip 25 of the tool 21 is grasped in the operator's hand. To tighten an object, the operator's thumb (of the hand grasping the tool 21) is used to push the rear end 109 of the selector valve 105 to move the valve forward within the valve chamber 57 to the forward position of the valve corresponding to the forward operating mode of the tool 21. As the selector valve 105 slides longitudinally within the valve chamber 57, the locator pin 123 is moved outward of the seat 119a corresponding to the reverse operating mode, against the bias of the spring, and slides along the transition portion 121 of the rear groove 115d until the pin is biased down into the seat 119b corresponding to the forward operating mode. The wrench socket is attached to the outer end 51 of the output shaft 37 and is then engaged with the object. The operator uses the index finger of the hand grasping the grip 25 to squeeze the trigger 59 inward toward the grip (without releasing the grip) to move the primary air valve 65 against the bias of the spring 67 and the pressurized air to its opened position. The speed at which the tool operates is variable (e.g. increases) in proportion to the inward movement of the trigger.

Pressurized air from the source of pressurized air flows through the air inlet 53 and into the valve chamber 57 via the inlet port 81 in the valve chamber wall 79. The air flows over the groove 115c corresponding to the forward operating mode and is directed through the associated outlet port 83 into the respective air passage 91. The pressurized air is then delivered to the air motor case 31 via the air passage 91 and corresponding air groove 95 in the backing plate 33. The pressurized air flows down through the air motor case 31 to the exhaust ports 69, passing over the vanes 45 to power the air motor 43 in a conventional manner to rotate the air motor in a forward (clockwise) direction. The torque generated by the air motor 43 drives rotation of the output shaft 37 via the drive shaft 41 and hammer mechanism 39 to apply sufficient torque to the object to tighten the object. Air exiting through the exhaust ports 69 of the air motor case 31 is directed through the air exhaust 71 and exhausted externally of the housing 23 through the bottom of the grip 25.

To adjust the torque generated by the air motor 43 in the forward operating mode of the tool 21, the operator's thumb may be used to manipulate the tab 139 (without releasing the grip) to rotate the lever 127, thereby rotating the selector valve 105 within the valve chamber 105. The tab 139 is aligned with the desired torque setting indicia 141 to select the torque output setting of the air motor 43. The ball 145 within the tab 139 is biased into the dimple 143 associated with the particular torque setting indicia 141 to releasably secure the lever 127 and selector valve 105 in this position. As the selector valve 105 is rotated, the extension member 125 partially covers the outlet port 83 of the valve chamber wall 79 corresponding to the forward operating position to restrict the flow of pressurized air to the air motor 34, thereby reducing the amount of torque generated by the air motor and transmitted to the object being tightened. The more the valve 105 is rotated in a direction to reduce torque, the more the outlet port 83 is covered by the extension member 125 to further reduce the torque generated by the air motor 43.

To loosen a fastener element, the tool 21 is operated in its reverse operating mode. The operator's index finger may be used to push the front end 107 of the selector valve 105 to move the valve rearward within the valve chamber 57 to the rearward position of the valve. As the selector valve 105 slides longitudinally within the valve chamber 57, the locator pin 123 is moved outward of the seat 119b corresponding to the forward operating mode, against the bias of the spring, and slides along the transition portion 121 of the rear groove 115d until the pin is biased down into the seat 119a corresponding to the reverse operating mode of the tool 21. The wrench socket on the outer end 51 of the output shaft 37 is engaged with the object to be loosened and the operator uses the index finger to squeeze the trigger 59 inward toward the grip 25 (without releasing the grip) to move the primary air valve 65 against the bias of the spring 67 and the pressurized air to its opened position.

Pressurized air from the source of pressurized air flows through the air inlet 53 and into the valve chamber 57 via the inlet port 81 in the valve chamber wall 79. The air flows over the groove 115b corresponding to the reverse operating mode and is directed through the respective outlet port 85 into the corresponding air passage 93. The pressurized air is then delivered to the air motor case 31 via the air passage 93 and associated air groove 97 in the backing plate 33. The pressurized air flows down through the air motor case 31 to the exhaust ports 69, passing over the vanes 45 to power the air motor 43 in the conventional manner to rotate the air motor in a reverse (counter-clockwise) direction. The torque generated by the motor 43 drives rotation of the output shaft 37 via the drive shaft 41 and hammer mechanism 39 to apply sufficient torque to the object to loosen the element.

It will be observed from the foregoing that the pneumatic rotary tool 21 of the present invention represents an improvement over conventional designs. As a result of the valve chamber 57, selector valve 105, extension 125 and lever 127 arrangement, the operator can control the mode of operation and the torque generated by the air motor 43 using only the hand grasping the grip of the housing, without releasing the grip, which results in quick, efficient control of the tool. Because the selector valve 105 is configured for controlling both the mode of operation and the torque generated by the air motor 43, the need for separate control systems is eliminated, thereby simplifying the manufacture and operation of the tool 21 and reducing the risk of mechanical failure.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A pneumatic rotary tool capable of operating in forward and reverse directions, the tool comprising:

a housing;

an output shaft supported by the housing for rotation about its longitudinal axis and projecting from the housing for transmitting torque to an object;

an air motor disposed in the housing and connected to the output shaft for driving rotation of the output shaft in the forward and reverse directions;

an air inlet constructed for connection to a source of pressurized air;

air passaging means extending from the air inlet to the motor for delivering pressurized air to the motor to power the motor, said passaging means including a first passage for delivering air to the motor to power the motor to drive the output shaft in the forward direction and a second passage for delivering air to the motor to power the motor to drive the output shaft in the reverse direction;

an air exhaust for exhausting air from the motor to outside the tool housing;

a selector valve supported by the housing and disposed between the air inlet and the first and second passages such that fluid communication between the air inlet and the first and second passages is blocked except through the selector valve, the selector valve being movable with respect to the housing between a first position in which the air inlet is in fluid communication with the first passage and fluid communication with the second passage is blocked by the valve for operating the tool in the forward direction, and a second position in which the air inlet is in fluid communication with the second passage and fluid communication with the first passage is blocked by the valve for operating the tool in the reverse direction;

the selector valve being constructed for selective adjustment of the selector valve to change the torque output of the motor;

the selector valve further being slidable translationally within the housing between the first and second positions and being rotatable within the housing for controlling the torque of the motor;

said air passaging means further comprising a valve chamber defined within the housing, the valve chamber receiving the selector valve and including an inlet port for receiving pressurized air from the air inlet, a first outlet port for discharging air in the chamber to the first passage and a second outlet port for discharging air in the chamber to the second passage, the selector valve being constructed such that in the first position the valve permits fluid communication between the inlet port and the first outlet port and blocks communication between the inlet port and the second outlet port, and in the second position the valve permits fluid communication between the inlet port and the second outlet port and blocks communication between the inlet port and the first outlet port;

the selector valve and valve chamber being generally cylindrical in shape, the selector valve having first and second annular grooves therein extending generally around the circumference of the selector valve, the first groove being generally aligned with the inlet port and the first outlet port of the valve chamber in the first position of the selector valve, the selector valve comprising a stopper surface disposed for covering a portion of the first outlet port to limit the flow of air, the amount of the first outlet port covered by the stopper surface being capable of change by rotation of the selector valve about its longitudinal axis, thereby to control the torque of the tool.

2. A pneumatic tool as set forth in claim 1 further comprising indicator means connected to the selector valve for conjoint rotation therewith, said indicator means being capable of indicating a torque setting corresponding to a given rotational position of the selector valve.

3. A pneumatic tool as set forth in claim 2 wherein the selector valve protrudes from a first side of the housing in the first position where it is accessible for sliding the selector valve to the second position, and protrudes from a second side of the housing in the second position for sliding the selector valve to the first position.

* * * * *